United States Patent
Stein et al.

(10) Patent No.: US 10,830,861 B2
(45) Date of Patent: Nov. 10, 2020

(54) METHOD FOR DIRECTION FINDING AND DIRECTION FINDER

(71) Applicant: Rohde & Schwarz GmbH & Co. KG, Munich (DE)

(72) Inventors: Moritz Stein, Poing (DE); Christoph Meyer, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 340 days.

(21) Appl. No.: 15/840,723

(22) Filed: Dec. 13, 2017

(65) Prior Publication Data
US 2018/0172795 A1 Jun. 21, 2018

(30) Foreign Application Priority Data

Dec. 21, 2016 (EP) .................................... 16205851

(51) Int. Cl.
*G01S 3/74* (2006.01)
*G01S 3/14* (2006.01)
*G01S 3/04* (2006.01)

(52) U.S. Cl.
CPC ............... *G01S 3/74* (2013.01); *G01S 3/043* (2013.01); *G01S 3/14* (2013.01)

(58) Field of Classification Search
CPC ..................... G01S 3/74; G01S 3/14
See application file for complete search history.

(56) References Cited

U.S. PATENT DOCUMENTS

| | | | | |
|---|---|---|---|---|
| 5,262,789 A * | 11/1993 | Silverstein | ............... | H01Q 3/22 342/368 |
| 5,359,333 A * | 10/1994 | Withers, Jr. | .............. | G01S 3/46 342/195 |
| 5,943,013 A * | 8/1999 | Ohashi | ...................... | G01S 3/14 342/417 |

(Continued)

FOREIGN PATENT DOCUMENTS

EP  1584943 B1  5/2008

OTHER PUBLICATIONS

Barabell. "Improving the Resolution Performance of Eigenstructure-Based Direction Finding Algorithms". ICASSP '83. IEEE International Conference on Acoustics, Speech, and Signal Processing, Boston, Massachusetts, USA, 1983, pp. 336-339. (Year: 1983).*

(Continued)

*Primary Examiner* — Gregory C. Issing
(74) *Attorney, Agent, or Firm* — Christensen O'Connor Johnson Kindness PLLC (57) ABSTRACT

A method for direction finding is described wherein incoming signals are scanned and analyzed. The bearing value and its quality of the incoming signals are determined by using a direction finding method. A covariance matrix is generated from the incoming signals by using a multiple-wave detector unit. The dimension of the covariance matrix is reduced in order to obtain a reduced covariance matrix. The eigenvalues of the reduced covariance matrix are determined. Then, it is determined whether more than one signal, a single signal or no signal is detected by using the eigenvalues and the quality determined by using the direction finding method. Further, a direction finder is described.

20 Claims, 3 Drawing Sheets

(56) References Cited

U.S. PATENT DOCUMENTS

| | | | | |
|---|---|---|---|---|
| 5,990,834 | A * | 11/1999 | Barrick | G01S 3/74 342/195 |
| 8,799,345 | B1 * | 8/2014 | Liou | G01S 3/74 708/520 |
| 2015/0097717 | A1 | 4/2015 | Tsai et al. | |

OTHER PUBLICATIONS

Wang et al. "Direction Finding Algorithms with Joint Iterative Subspace Optimization". IEEE Trans. Aerosp. Electron. Syst., vol. 50, No. 4, pp. 2541-2553, Oct. 2014. (Year: 2014).*

Khallaayou. "High Resolution Direction of Arrival Estimation Analysis and Implementation in a Smart Antenna System". PhD Thesis Montana State University. 2010 (Year: 2010).*

De Paolo, Tony et al. "Properties of HF RADAR Compact Antenna Arrays and Their Effect on the MUSIC Algorithm." Scripps Institution of Oceanography Technical Report, Scripps Institution of Oceanography, UC San Diego. Nov. 2007 (Year: 2007).*

Extended European Search Report dated Jun. 20, 2017, issued in priority European Application No. 16205851.5, filed Dec. 21, 2016, 6 pages.

* cited by examiner

METHOD FOR DIRECTION FINDING AND DIRECTION FINDER

FIELD OF THE DISCLOSURE

Embodiments of the present disclosure relate to a method for direction finding as well as a direction finder.

BACKGROUND

Direction finding is the measurement of a direction of an incoming signal received by a direction finder. In general, radio or other electromagnetic waves can be detected by a direction finder. Typically, two methods for direction finding are known in the state of the art.

One of these methods is known as conventional direction finding and the other one as high-resolution direction finding or super resolution direction finding (SRDF). These two methods distinguish from each other in their information obtained as the conventional direction finding method can only detect a single incident signal whereas the high-resolution direction finding method provides additional information about the number of signal emitters of incoming signals that were detected simultaneously by the direction finder. Accordingly, the high-resolution direction finding allows to separate time correlated co-channel signals and to locate their signal sources, in particular the parameters azimuth and elevation.

This additional information is gathered by an evaluation step in which the incoming signals are used for calculating a correlation matrix. The eigenvalues of this correlation matrix are obtained by using QR decomposition or other methods in order to detect the presence of co-channel signals. To evaluate the number of signal emitters, the degree of correlation of the co-channel signals is determined wherein the spatial and temporal correlations are taken into account.

Generally, coherent co-channel interferences can occur when an emitted signal of one signal emitter is reflected by other objects whereas incoherent co-channel interferences occur when different signal emitters are used simultaneously. Hence, it is necessary to separate the incoherent co-channel interferences from the coherent co-channel interferences in order to evaluate the number of signal emitters. Appropriate procedures for separating these co-channel interferences are known. For instance, a high-resolution direction finding or super resolution direction finding method is described in EP 1 584 943 B1, which is incorporated by reference in its entirety.

However, high-resolution direction finding is very complex as it requires high computational capacity, time and a large chip surface. Thus, the high-resolution direction finding method is also expensive.

Further, the conventional direction finding method mentioned above provides information regarding the bearing value and its quality. However, the quality value determined by this conventional direction finding method may be false. As the conventional direction finding method can only detect a single incoming signal, different signals, in particular coherent and/or incoherent co-channel interferences, may impair the determination process of the quality value.

SUMMARY

Accordingly, there is a need for a less complex technique to gather information regarding the number of incoming signals such that it can be decided if the quality value determined is reliable.

In general, the term "conventional direction finding method" is used herein to mean a direction finding method that can only detect a single incident signal. As will be described in more detail below, embodiments described herein utilized a direction finding method. In embodiments of the present disclosure, these direction finding methods can include either the conventional direction finding method or the high-resolution direction finding method described above. In some of these embodiments or others, the direction finding method is a correlative interferometer direction finding method.

Embodiments of the present disclosure provide a method for direction finding wherein incoming signals are scanned. The incoming signals are analyzed. The bearing value and its quality of the incoming signals are determined by using a direction finding method, such as the conventional direction finding method described above. A covariance matrix is generated from the incoming signals by using a multiple-wave detector unit. The dimension of the covariance matrix is reduced in order to obtain a reduced covariance matrix. The eigenvalues of the reduced covariance matrix are determined. It is further determined whether more than one signal, a single signal or no signal is detected by using the eigenvalues and the quality determined by using the direction finding method, such as the conventional direction finding method.

Further, embodiments of the present disclosure provide a direction finder that comprises several antenna elements for receiving incoming signals, a multiple wave detector unit and a processing unit for analyzing the incoming signals. The processing unit is configured to determine the bearing value and its quality of the incoming signals by using a direction finding method, such as the conventional direction finding method. The multiple wave detector unit is configured to generate a covariance matrix from the incoming signals, reduce the dimension of the covariance matrix in order to obtain a reduced covariance matrix and to determine the eigenvalues of the reduced covariance matrix. The direction finder is configured to determine whether more than one signal, a single signal or no signal is detected by using the eigenvalues and the quality determined by using the direction finding method, such as the conventional direction finding method.

Accordingly, improvements to known methods for direction finding is provided by the additional use a multiple wave detector unit for estimating the number of incoming signals, in particular the number of different signal emitters. In some embodiments, a direction finding method, such as the conventional direction finding method, and the estimation of the number of incoming signals by determining the eigenvalues of the reduced covariance matrix are combined in order to determine whether more than one signal, a single signal or no signal is detected. Thus, multiple signals can be detected without using a high-resolution method that is computationally intensive.

The reduction of the dimension of the covariance matrix reduces the computer capacity required for determining the eigenvalues of the reduced covariance matrix. The covariance matrix, in particular its eigenvalues determined, is only used for estimating the number of signals and, therefore, the reduced covariance matrix is sufficient for analyzing purposes since the quality determined by using a direction finding method, such as the conventional direction finding method, is additionally used as an input parameter for determining the number of signals. Accordingly, the mathematic methods used for decomposition of the reduced covariance matrix are simpler compared to mathematic methods used for decomposition of high dimensional covariance matrixes such as a 5×5 or higher dimensional matrix. Thus, the computer capacity required for decomposition purposes can be reduced. In addition, a smaller number of samples received by the direction finder can be used for generating the covariance matrix due to the fact that the dimension of the covariance matrix will be reduced anyway.

The method for direction finding provides information regarding the bearing value and its quality. The quality may be provided by the so called quality metric of a direction finding method, such as the conventional direction finding method, which can be obtained in a known manner, for instance by using a direction finding method according to Watson-Watt. Thus, the quality metric is enlarged with respect to known methods for direction finding as the quality of the bearing value determined by using the conventional direction finding method is used as an input parameter for determining whether more than one signal, a single signal or no signal is received. The quality determined by using the conventional direction finding method improves the estimation step appropriately. Therefore, the multiple wave detector unit uses the eigenvalues of the reduced covariance matrix as well as the quality determined by, for example, the conventional direction finding method, for estimating the number of incoming signals, in particular determining whether more than one signal, a single signal or no signal is received.

Generally, more information is gathered with respect to the conventional direction finding method as an estimation of the number of different signals is provided while the complexity of the direction finding method is reduced with respect to a high-resolution or super resolution direction finding method. It is sufficient to use the generated covariance matrix only partly for estimating the number of signals since the quality determined by using a direction finding method, such as the conventional direction finding method, is used as an additional input parameter such that the estimated number by using only a part of the generated covariance matrix and the quality both are used for determining whether more than one signal, a single signal or no signal is received.

According to an aspect, the number of signals is estimated while a direction finding method, such as the conventional direction finding method, is performed in parallel. Hence, the parameters, in particular the bearing value, its quality as well as the estimated number of signals detected, can be obtained substantially simultaneously while using the direction finder. Thus, the information related to the parameters is provided in real time. Moreover, the direction finding method, such as the conventional direction finding method, is not used subsequently to determine the number of signals only in case that a single signal or no signal has been detected. By using these parameters, in particular the quality and the estimated number of signals received, it can be determined whether more than one signal, a single signal or no signal is received.

According to another aspect, a frequency range is scanned that is subdivided into different channels, in particular wherein the bearing value and its quality are determined, for example, for each channel. Thus, the whole frequency range that is scanned by the direction finder is subdivided into different sub-ranges that are allocated to certain channels. The frequency range of the signals received by each antenna element is subdivided into corresponding channels for each antenna element, in particular in a similar manner. Further, the quality metric provides information for each channel, in particular each sub-range of the frequency range, wherein the information comprises the bearing value and its quality.

Furthermore, a channel assignment may be determined for each channel. The determination step whether more than one signal, a single signal or no signal is received is also done for each sub-range allocated to a certain channel. Hence, the information obtained also comprises information regarding the number of signals per channel, in particular whether more than one signal, a single signal or no signal is provided. This information is called the channel assignment.

According to a certain embodiment, a high-resolution direction finding method is performed for each channel that is assigned by more than one signal automatically and subsequent to the determination steps. No manual input is required such that the direction finder automatically starts a high-resolution direction finding method for the channels that may comprise more than one signal. The user of the direction finder only has to start the direction finding procedure wherein the direction finder scans and analyzes the incoming signals. Hence, the bearing value, its quality as well as the channel assignment are determined for each channel, respectively. Afterwards, only certain channels are analyzed in detail by using the high-resolution direction finding method in order to exactly determine the number of signals. Thus, the measuring time can be reduced dramatically as only the relevant channels are subjected to the high-resolution or super resolution direction finding method in order to determine the exact number of signal allocated to these channels.

Generally, the frequency range may be a broadband frequency range and/or the different channels may be narrowband. Thus, the method as well as the direction finder can be applied for broadband applications since the broadband frequency range is subdivided into different narrowband channels relating to the several frequency sub-ranges.

According to another aspect, certain channels are selected by using a level threshold value for the incoming signals. It is ensured that only channels are used for analyzing purposes that comprise signals having a certain level. For instance, random noise is disregarded from analyzing purposes. The bearing value and its quality as well as the channel assignment are only obtained for the channels selected such that the process time is reduced.

The channels may be selected automatically by using the level threshold value or manually.

According to a certain aspect, the channels are obtained by a Fourier Transform, for example, a Fast Fourier Transform. Hence, the signals received by each antenna element are subdivided via a certain Fourier Transform algorithm into narrowband Fourier Transform channels. These data are further processed by the direction finder via a processing unit, a computer, or the like.

The bearing value may comprise the azimuth angle and the elevation angle of the incoming signal. Thus, at least the horizontal and orthogonal angles are provided by the bearing value.

According to another aspect, the quality has a value between 1% and 100%. The quality is derived from the complex voltages measured at the antenna elements. In general, the quality metric provides information about the determination of the bearing value, in particular about the correctness of the determination of the azimuth and the elevation angles. In other words, the quality indicates the probability that the determined values for the azimuth and the elevation angles are the correct ones.

In some embodiments, the bearing value, the quality and/or the channel assignment is/are displayed, for example, on a graphical user interface. Accordingly, a user being less qualified is able to operate the direction finder since the relevant information is displayed and easily accessible. The information, in particular the bearing value, the quality and/or the channel assignment, may be displayed for each channel separately such that the user may select the channel being of interest. Furthermore, all channels or several channels may be displayed simultaneously.

Additionally, the exact number of signals per channel may be displayed when a high-resolution direction finding method has been performed (automatically) such that the exact number has been determined. This information can also be provided for displaying purposes.

Furthermore, the dimension of the reduced covariance matrix may be 3×3. A 3×3 matrix can be used for determining the eigenvalues instead of a 5×5 or higher dimensional covariance matrix that is typically used for determining the eigenvalues since the covariance matrix is only used for estimating the number of signals. The determination is done by using the estimated number and the quality determined by using the conventional direction finding method. The decomposition of the 3×3 matrix is easier compared to the decomposition of a 5×5 or higher dimensional matrix. Thus, mathematical methods can be applied that are simpler and require less computational capacities.

Generally, the multiple wave detector unit may use the reduced covariance matrix as well as the quality determined by the conventional direction finding method in order to determine whether more than one signal, a single signal or no signal is received, in particular for each different channel allocated to the sub-ranges of the whole frequency range scanned.

In some embodiments, the eigenvalues obtained from the reduced covariance matrix and the quality of the bearing value are used to determine the channel assignment with a high accuracy. Accordingly, it is ensured that the channel assignment has a higher probability while using the quality of the bearing value as an additional input parameter. Thus, it can be prevented that incorrect bearing values due to co-channel signals are interpreted as being correct.

According to a certain embodiment, the multiple wave detector unit may be part of the processing unit. Thus, the processing unit itself estimates the number of signals received, for example, for each channel separately.

Moreover, the direction finder may be configured to scan and subdivide a frequency range into different channels, in particular wherein the direction finder is configured to determine the channel assignment for each channel. Thus, the direction finder, and in some embodiments its processing unit, can determine whether more than one signal, a single signal or no signal is received, for example, for each channel separately. The estimation step of the direction finding process may be performed by the direction finder itself. The different channels allocated to narrowband sub-ranges of the whole broadband frequency range scanned can be obtained by using Fourier Transform algorithms that are applied to the incoming signals received.

According to another aspect, the direction finder comprises a display that is configured, for example, to display information regarding the bearing value, its quality and/or the channel assignment for each channel. Thus, the processing unit may generate a graphical user interface (GUI) that provides the information to the user of the direction finder such that the user can easily select the channel of interest for gathering the corresponding information. Furthermore, all channels or several channels can be displayed simultaneously.

The direction finder may be configured to automatically perform a high-resolution direction finding method for each channel that is assigned by more than one signal. Thus, only these channels that may have more than one signal are checked by a high-resolution direction finding method such that the measuring and analyzing time is reduced as only certain channels are checked appropriately.

The exact number of signals determined by the high-resolution direction finding method may be displayed in the graphical user interface.

In some embodiments, the direction finder is configured to perform methods for direction finding as described above. The characteristics and advantages described above with regard to the method also apply to the direction finder in a similar manner.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
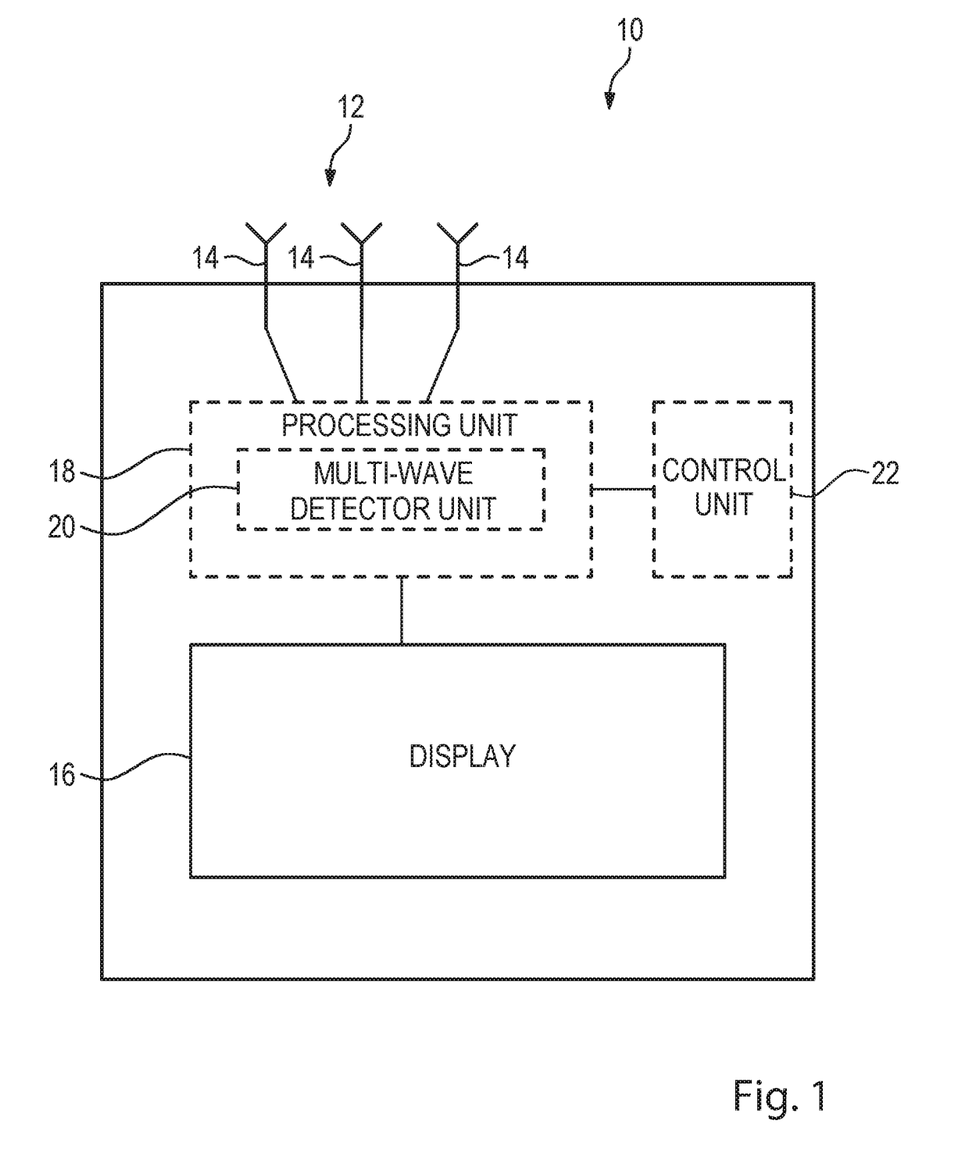
FIG. 1 schematically shows a direction finder according to one representative embodiment of the present disclosure.

In FIG. 1, a direction finder 10 is schematically shown that comprises an antenna system 12 having several antenna elements 14. In the shown embodiment, the antenna system 12 comprises three antenna elements 14 being broadband antenna elements. However, the antenna system 12 may also comprise more than three antenna elements 14, for instance ten.

The direction finder 10 is used for determining the location of a signal emitter that emits a signal which is received by the direction finder 10, for example, via the antenna system 12. In addition, the direction finder 10 comprises a display 16 and a processing unit 18 that is connected to the display 16 for controlling the information displayed on the display 16. Usually, the processing unit 18 generates a graphical user interface that is displayed on the display 16 wherein the content of the graphical user interface is determined by the processing unit 18 itself.

The processing unit 18 is also connected to the antenna system 12 such that the received data can be processed and analyzed by the processing unit 18, for instance by the conventional direction finding method. In the shown embodiment, the processing unit 18 comprises a multiple-wave detector unit 20 that is used for analyzing purposes as will be described later. Alternatively, the multiple-wave detector unit 20 can be formed separately from the processing unit 18 such that the multiple-wave detector unit 20 is also connected to the antenna system 12 for gathering the received data. Moreover, the direction finder 10 comprises a control unit 22 that is used for controlling the direction finder 10, in particular automatic internal processes.

Generally described, the processing unit 18, the multiple-wave detector unit 20, and/or the control unit 22 may include, in some embodiments, logic to perform, implement or otherwise carry out methodologies and technologies described herein. In some embodiments, this logic can be carried out in either hardware or software, or a combination of hardware and software. In some embodiments, the processing unit 18, the multiple-wave detector unit 20, and/or the control unit 22 includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, the processing unit 18, the multiple-wave detector unit 20, and/or the control unit 22 includes a microprocessor and a memory storing logic modules and/or instructions. In an embodiment, the processing unit 18, the multiple-wave detector unit 20, and/or the control unit 22 includes one or more ASICs having a plurality of predefined logic components. In an embodiment, the processing unit 18, the multiple-wave detector unit 20, and/or the control unit 22 includes one or more FPGA having a plurality of programmable logic components. In an embodiment, the processing unit 18, the multiple-wave detector unit 20, and/or the control unit 22 includes hardware circuit implementations (e.g., implementations in analog circuitry, implementations in digital circuitry, and the like, and combinations thereof). In an embodiment, the processing unit 18, the multiple-wave detector unit 20, and/or the control unit 22 includes combinations of circuits and computer program products having software or firmware instructions stored on one or more computer readable memories that work together to cause a device to perform one or more methodologies or technologies described herein In general, the direction finder 10 scans the whole frequency range which might be a broadband frequency range for incoming signals that may be emitted by different signal emitters. The incoming signals are received by each antenna element 14 separately.

The broadband frequency range is subdivided into different frequency sub-ranges wherein each sub-range is allocated to a certain channel. This is done for each antenna element 14 individually such that each antenna element 14 is allocated to certain channels.

The channels can be derived by a Fourier Transform algorithm, for example, a Fast Fourier Transform algorithm, such that these channels can be called Fourier channels or FFT-channels.

Figure 2:
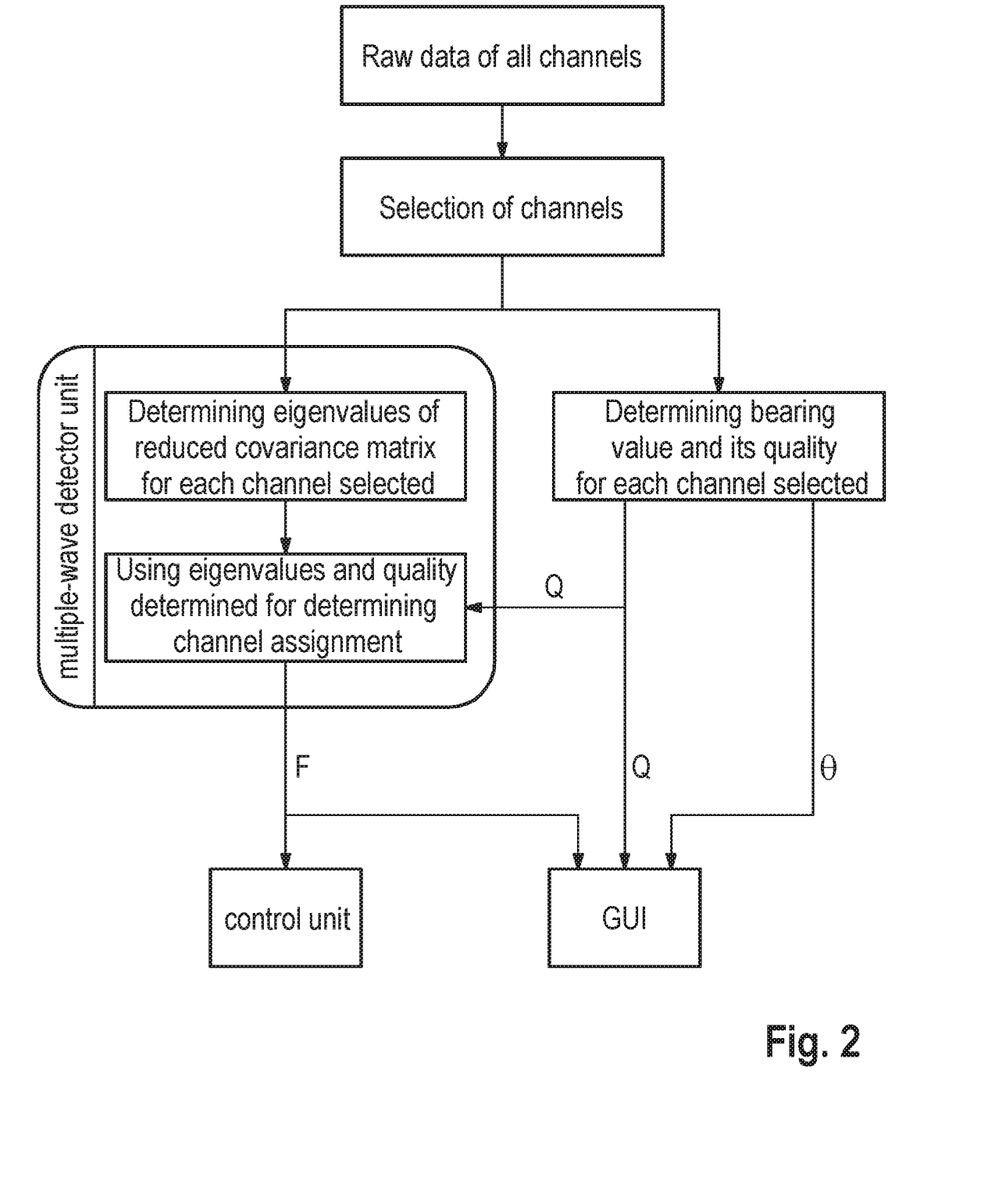
FIG. 2 shows a flow chart representing a method according to one representative embodiment of the present disclosure.

With respect to FIG. 2, the method for direction finding is described in detail. The data received by the processing unit 18 relate to the incoming signals that have been received by the antenna elements 14. These data are called raw data of the direction finder 10 that correspond to the complex voltages of the different antenna elements 14.

Then, certain channels are selected that are analyzed in detail. For instance, these channels are selected automatically by a level threshold value such that channels which are only allocated to random noise are excluded from analyzing purposes. Signals that are deemed to be random noise have a level that is too low to be a wanted signal. For instance, the signal-to-noise-ratio (SNR) is used for providing the level threshold. Alternatively, the channels are selected manually by the user of the direction finder 10.

The incoming signals, in particular the raw data, of the selected channels are then analyzed such that the bearing value ($\theta$) and its quality (Q) are determined by a direction finding method, such as a correlative interferometer direction finding method.

In general, the bearing value ($\theta$) may comprise the azimuth angle and the elevation angle wherein the quality (Q) indicates the probability that the determined values for the azimuth and the elevation angles are correct. Accordingly, the quality (Q) may have a value between 1% and 100%.

In parallel with the direction finding method, such as the conventional direction finding method, the raw data are processed by the multiple-wave detector unit 20 wherein a covariance matrix is generated by the raw data obtained. The dimension of this covariance matrix is reduced in order to obtain a reduced covariance matrix that can be handled easily, for instance a 3×3 covariance matrix. Then, the eigenvalues of the reduced covariance matrix are determined for all selected channels.

As the dimension of the covariance matrix is reduced, in particular to a 3×3 matrix, simpler mathematical methods can be applied for matrix decomposition of the covariance matrix. Accordingly, the computational capacity required is reduced with respect to a high-resolution direction finding method.

Further, a smaller number of samples received by the antenna system 12 may be used for generating the covariance matrix since its dimension will be reduced anyway.

The eigenvalues of the reduced covariance matrix are only used for estimating the number of signals per channels. Thus, it is sufficient to use the covariance matrix only partly, in particular the reduced covariance matrix.

The eigenvalues determined as well as the quality (Q) determined by the conventional direction finding method are used in order to determine a channel assignment (F) for each channel selected. Thus, it can be determined whether more than one signal, a single signal or no signal is provided for each channel selected.

As shown in FIG. 2, a direction finding method, such as the conventional direction finding method, and the determination of the eigenvalues of the reduced covariance matrix are performed in parallel, in particular simultaneously. Hence, the parameters are obtained in real time.

In general, the channel assignment (F) of each channel is determined by using the multiple-wave detector unit and the quality (Q) determined in addition. For instance, an order estimator is used for determining whether more than one signal, a single signal or no signal is provided, particularly per channel, wherein the order estimator may be based on the "minimum description length"-principle (MDL principle).

In general, $M^*-1$ different signal can be determined for $M^*$ eigenvalues obtained from the reduced covariance matrix generated by the incoming signals received by M antenna elements 14.

If N different signals are received with N≥M*, the probability will decrease that the channel assignment (F) is determined correctly by only using the eigenvalues determined. However, since the quality (Q) determined by the direction finding method, such as the conventional direction finding method, is additionally used, the probability of the channel assignment (F) is improved significantly. In some embodiments, the conventional direction finding method includes a correlative interferometer direction finding method.

Figure 3:
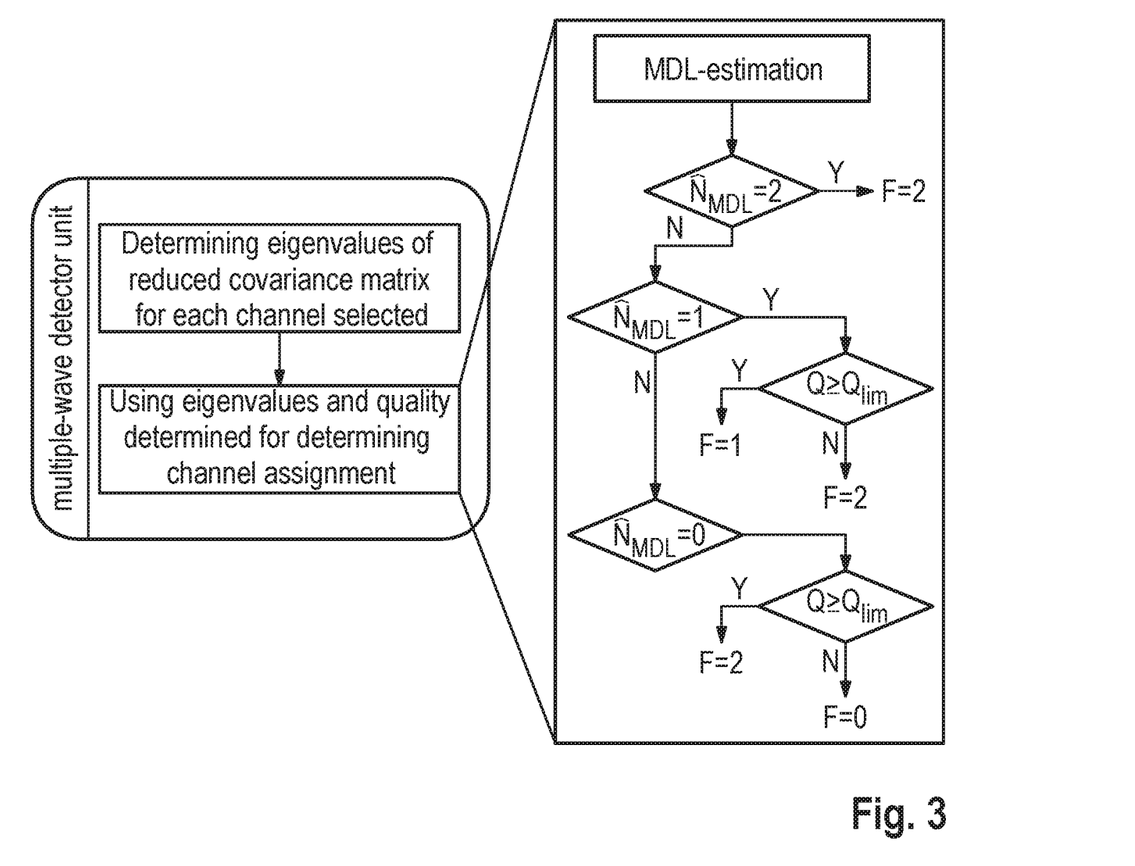
FIG. 3 shows an overview representing the estimation process shown in the flow chart of FIG. 2.

In FIG. 3, an overview is shown that represents the determination step shown in the flow-chart of FIG. 2. When the multiple-wave detector unit 20 estimates that more than one signal is allocated to a certain channel due to the eigenvalues determined from the reduced covariance matrix, then this estimation is deemed to be true (F=2).

When the multiple-wave detector unit 20 estimates that exactly a single signal is allocated to a certain channel due to the eigenvalues determined from the reduced covariance matrix, then the quality (Q) determined is additionally taken into account wherein the quality (Q) determined is compared to a pre-determined limit value for the quality ($Q_{lim}$). The limit value for the quality is chosen such that a quality value being equal to or higher than the limit value for the quality corresponds to a single signal. If the condition ($Q≥Q_{lim}$) is fulfilled, a single signal is allocated to that channel (F=1) otherwise more than one signal are allocated to that channel (F=2). The pre-estimated channel assignment is corrected appropriately if necessary.

When the multiple-wave detector unit 20 estimates that no signal is allocated to a certain channel due to the eigenvalues determined from the reduced covariance matrix, then the quality (Q) determined is additionally taken into account again wherein the quality (Q) determined is compared to the pre-determined limit value for the quality ($Q_{lim}$). If the above mentioned condition is fulfilled, more than one signal is allocated to that channel (F=2) otherwise no signal is allocated to that channel (F=0). The pre-estimated channel assignment is corrected appropriately if necessary.

Therefore, it can be determined with minor effort if a certain channel comprises more than one signal, a single signal or no signal by using the eigenvalues determined from the reduced covariance matrix and the quality additionally.

Thus, information regarding the incoming signals is obtained that relates to the bearing value (θ), for instance the incident angles, in particular the azimuth angle and the elevation angle, of the incoming signals, its quality (Q) and the channel assignment (F) for each channel individually. This information can be displayed on the display of the direction finder, for example, on the graphical user interface (GUI). The processing unit 18 controls the graphical user interface to be displayed appropriately.

Furthermore, the information gathered, for example, the channel assignment (F), can be used for an automatic direction finding process.

This means that a high-resolution direction finding process is started for each channel that has an estimated channel assignment (F) being greater than one, in particular wherein the high-resolution direction finding process is started automatically and subsequent to the processes shown in FIGS. 2 and 3. For this purpose, the channel assignment (F) determined is directed to the control unit 22 such that the high-resolution direction finding process is initiated for the dedicated channels (please refer to FIG. 2), for example, those that have a channel assignment of more than one signal.

Accordingly, a high-resolution direction finding process is performed in an efficient manner as only these channels being of interest due to the channel assignment (F=2) may be scanned by a high-resolution direction finding process subsequently.

Hence, it is ensured that channels having no signal or just a single signal are not exposed to a time-consuming high-resolution direction finding process which in turn reduces the measuring time and improves the efficiency.

The direction finder 10 shown in FIG. 1 is configured to perform the method shown in FIGS. 2 and 3 as well as the high-resolution direction finding process subsequently and automatically for the channels being of interest.

Generally, the computational capacity required for performing the method for direction finding according to the present disclosure is reduced with respect to a high-resolution direction finding method since only a part of the covariance matrix is used for determining the eigenvalues. The reduced dimension of the covariance matrix used for determining the eigenvalues also ensures that mathematical methods can be applied that are less complex and requires less computational capacity.

Accordingly, the number of signals, for instance, per channel, can be determined easily, with high accuracy and in a very cost-efficient manner compared to a conventional direction finding method or a high-resolution direction finding method. Further, the direction finder itself can be formed in a cost-efficient manner since no high computational capacities are required compared to directional finders using high-resolution direction finding methods.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for direction finding performed by a direction finder comprising:
receiving incoming signals in a frequency range via an antenna system of the direction finder,
analyzing the incoming signals received to determine a bearing value of the incoming signals received and a quality of the bearing value by using a conventional direction finding method,
generating a covariance matrix from the incoming signals,
reducing the dimension of the covariance matrix in order to obtain a reduced covariance matrix,
determining eigenvalues of the reduced covariance matrix, and
determining whether more than one signal, a single signal or no signal is detected by using the eigenvalues and the quality of the bearing value determined by using the direction finding method, wherein the eigenvalues determined are used for estimating the number of signals received, wherein the quality of the bearing value determined is used when estimating whether a single signal or no signal is allocated to a certain channel.

2. The method according to claim 1, wherein the number of signals is estimated, and wherein the estimation of the number of signals and the direction finding method are performed in parallel.

3. The method according to claim 1, wherein the frequency range is subdivided into different sub-ranges that are allocated to respective channels.

4. The method according to claim 3, wherein the bearing value and its quality are determined for each channel.

5. The method according to claim 3, wherein a channel assignment is determined for each channel.

6. The method according to claim 5, wherein a high-resolution direction finding method is performed for each channel that is assigned by more than one signal automatically and subsequent to the determination steps.

7. The method according to claim 1, wherein the bearing value comprises an azimuth angle and an elevation angle of the incoming signal.

8. The method according to claim 1, wherein the quality has a value between 1% and 100%.

9. The method according to claim 1, wherein the bearing value, the quality and/or the channel assignment is/are displayed.

10. The method according to claim 1, wherein the bearing value, the quality and/or the channel assignment is/are displayed on a graphical user interface.

11. The method according to claim 1, wherein the dimension of the reduced covariance matrix is 3×3.

12. A direction finder, comprising:
a plurality of antenna elements configured for receiving incoming signals;
a multiple-wave detector unit and
a processing unit configured for analyzing the incoming signals, wherein the processing unit is configured to determine a bearing value of the incoming signals received and the quality of the bearing value by using a direction finding method,
wherein the multiple-wave detector unit is configured to generate a covariance matrix from the incoming signals, reduce the dimension of the covariance matrix in order to obtain a reduced covariance matrix, and determine eigenvalues of the reduced covariance matrix, and
wherein the direction finder is configured to determine whether more than one signal, a single signal or no signal is detected by using the eigenvalues and the quality determined by using the direction finding method,
wherein the multiple-wave detector is configured to estimate the number of signals received based on the eigenvalues determined, and wherein the direction finder is configured use the quality of the bearing value determined when estimating that a single signal or no signal is allocated to a certain channel.

13. The direction finder according to claim 12, wherein the multiple-wave detector unit is part of the processing unit.

14. The direction finder according to claim 12, wherein the direction finder is configured to subdivide a frequency range into different sub-ranges that are allocated to respective channels.

15. The direction finder according to claim 14, wherein the direction finder is configured to determine the channel assignment for each channel.

16. The direction finder according to claim 12, wherein the direction finder comprises a display that is configured to display information regarding the bearing value, its quality and/or the channel assignment.

17. The direction finder according to claim 12, wherein the direction finder comprises a display that is configured to display information regarding the bearing value, its quality and/or the channel assignment for each channel.

18. The direction finder according to claim 12, wherein the direction finder is configured to automatically perform a high-resolution direction finding method for each channel that is assigned by more than one signal.

19. The direction finder according to claim 12, wherein the direction finder is configured to perform the following steps:
receiving incoming signals in a frequency range via an antenna system of the direction finder,
analyzing the incoming signals received to determine a bearing value of the incoming signals received and a quality of the bearing value by using a conventional direction finding method,
generating a covariance matrix from the incoming signals,
reducing the dimension of the covariance matrix in order to obtain a reduced covariance matrix,
determining eigenvalues of the reduced covariance matrix, and
determining whether more than one signal, a single signal or no signal is detected by using the eigenvalues and the quality of the bearing value determined by using the direction finding method, wherein the eigenvalues determined are used for estimating the number of signals received, wherein the quality of the bearing value determined is used when estimating whether a single signal or no signal is allocated to a certain channel.

20. A method for direction finding performed by a direction finder, comprising:
receiving incoming signals in a frequency range;
analyzing the incoming signals received;
determining a bearing value of the incoming signals received and a quality of the bearing value by using a conventional direction finding method when analyzing the incoming signals received,
generating a covariance matrix from the incoming signals by using a multiple-wave detector unit,
reducing the dimension of the covariance matrix in order to obtain a reduced covariance matrix,
determining eigenvalues of the reduced covariance matrix, and
determining whether more than one signal, a single signal or no signal is detected by using the eigenvalues and the quality determined by using the conventional direction finding method, wherein the number of incoming signals is estimated based on the eigenvalues determined, and wherein the quality of the bearing value determined is employed in order to improve the estimation.

* * * * *